Jan. 2, 1923.
J. W. HEYER.
EMERGENCY ATTACHMENT FOR BROKEN HUBS.
FILED SEPT. 26, 1922.
1,440,736.
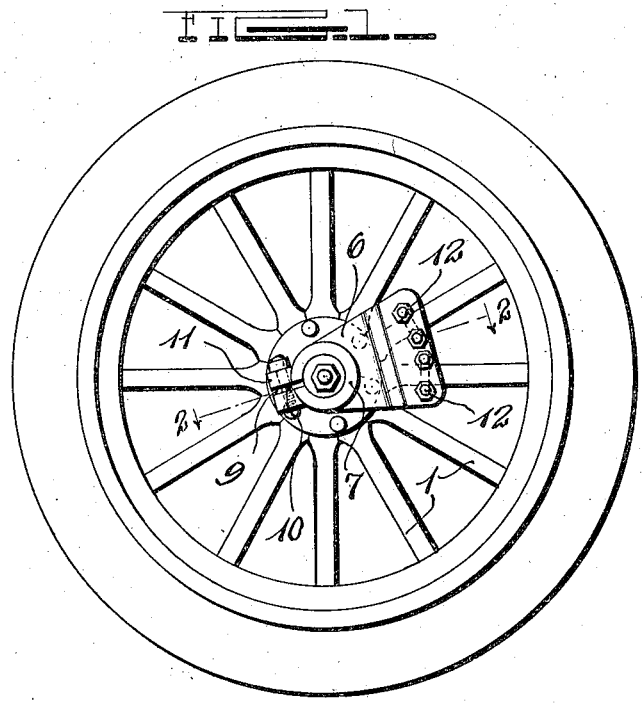
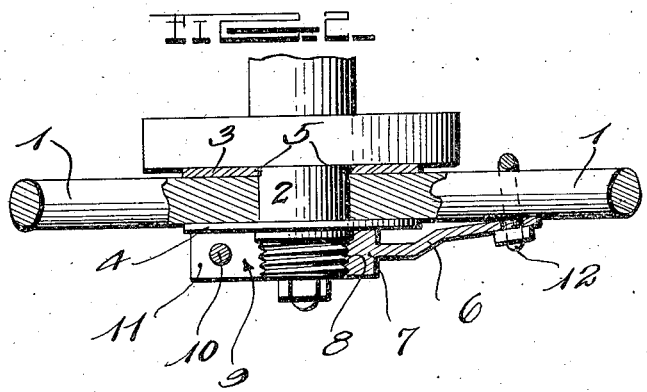

Patented Jan. 2, 1923.

1,440,736

UNITED STATES PATENT OFFICE.

JOSEPH W. HEYER, OF KINGMAN, ARIZONA.

EMERGENCY ATTACHMENT FOR BROKEN HUBS.

Application filed September 26, 1922. Serial No. 590,729.

*To all whom it may concern:*

Be it known that I, JOSEPH W. HEYER, a citizen of the United States, residing at Kingman, in the county of Mohave and State of Arizona, have invented certain new and useful Improvements in Emergency Attachments for Broken Hubs; and I do declare the following to be a full, clear, and exact description of the invention, such as will enable others skilled in the art to which it appertains to make and use the same.

My invention relates to improvements in automobile accessories and has for its object to provide a simple and efficient device whereby a driving connection may be established between the rear wheel and its hub, in case this hub should break loose from the hub plate at the inner side of the wheel. With machines of the present day types, whenever the hub is broken from the spoke engaging plate at the inner side of the wheel, said hub will spin idly within the inner and outer plates and the spokes and will not drive the wheel, but by the provision of my invention, an effective driving connection is established.

With the foregoing in view, the invention resides in the novel subject matter hereinafter described and claimed, the description being supplemented by the accompanying drawings.

Figure 1 is a side elevation of an automobile wheel equipped with my invention.

Figure 2 is a horizontal section partly in elevation.

In the drawings above briefly described, the numeral 1 designates the spokes of an ordinary automobile wheel, 2 has reference to a driving hub surrounded by the spokes, and the numerals 3 and 4 refer to the usual inner and outer plates which surround the hub and clamp the spokes 1 in place. While the plate 3 is integral with the hub 2, the rough lines 5 indicate in Fig. 2 that it has been broken from said hub, which would permit the latter to turn freely within the spokes and the two plates 3 and 4, without driving the wheel. When such an emergency occurs, I merely remove the ordinary hub cap (not shown) and substitute my invention which is clamped upon the hub and secured also to the spokes.

The numeral 6 designates a relatively wide and flaring plate having a comparatively thick integral hub-like portion 7 at its inner end provided with an opening 8 to receive the threaded outer end of the hub 2 which usually engages the hub cap, the wall of the opening being threaded for engagement with the threads of the hub. The hub portion 7 of the plate 6 is split as indicated at 9 and a bolt 10 passes through the integral ears 11 at opposite sides of the split, so that said portion 7 may be tightly clamped around the hub. The outer end of the plate 6 which terminates intermediate the radius of the wheel but closer to the hub portion than the rim portion thereof is provided with a pair of U-bolts or other suitable means 12 for clamping it to one or more of the wheel spokes. It will thus be seen that driving of the hub in turn drives the plate 6 and the latter drives the wheel. Thus, the machine can be safely driven to a place at which it may be adequately repaired.

As excellent results have been obtained from the details disclosed, they are preferably followed, but within the scope of the invention as claimed, numerous minor changes may be made.

I claim:

A wheel hub attachment comprising a relatively thick hub-like part to fit onto the existing wheel hub, the wall of the opening of said part being provided with screw-threads to engage the threads on said wheel hub, said part being split on one side and equipped with integral spaced apertured ears extending laterally from the peripheral portion on opposite sides of the split, a clamping bolt passing through the apertures in the ears, a relatively wide and flat plate extending from the peripheral portion of the aforesaid part at a point substantially diametrically opposite the ears for extending radially of a wheel from the hub portion thereof towards the rim portion, said plate being integral with said part and being offset between its ends and means for securing the free end portion of said plate to the spokes of a wheel intermediate the radius thereof but closer to the hub portion of the wheel than the rim portion thereof, and a plurality of fastening devices on the last named ends of the plate for connection to the spokes.

In testimony whereof I have hereunto affixed my signature.

JOSEPH W. HEYER.